United States Patent [19]

Kluge et al.

[11] Patent Number: 5,143,711
[45] Date of Patent: Sep. 1, 1992

[54] PROCESS FOR MANUFACTURING A PRECURSOR POWDER FOR USE IN MAKING A VARISTOR AND A POWDER MANUFACTURED IN THIS PROCESS

[75] Inventors: Wolfgang Kluge; Roger Perkins, both of Baden; Marco Rossinelli, Fislisbach, all of Switzerland; William J. Dawson, Columbus, Ohio

[73] Assignee: Asea Brown Boveri Ltd., Baden, Switzerland

[21] Appl. No.: 446,459

[22] Filed: Dec. 5, 1989

[51] Int. Cl.$^5$ .............................................. C01G 1/00
[52] U.S. Cl. ................................... 423/593; 252/518; 423/104; 423/622; 423/592; 264/61
[58] Field of Search ................ 501/120; 423/622, 104, 423/593, 592; 264/61; 252/518

[56] References Cited

U.S. PATENT DOCUMENTS

| | | |
|---|---|---|
| 4,176,094 | 11/1979 | Horowitz et al. .................. 252/518 |
| 4,440,670 | 4/1984 | Horowitz et al. .................. 252/518 |
| 4,681,717 | 7/1987 | Brooks et al. ..................... 252/518 |
| 4,748,139 | 5/1988 | Burba ................................. 501/120 |
| 4,839,339 | 6/1989 | Bunker et al. ..................... 252/518 |

Primary Examiner—Aaron Weisstuch
Assistant Examiner—Edward Squillante
Attorney, Agent, or Firm—Burns, Doane, Swecker & Mathis

[57] ABSTRACT

A method for manufacturing a precursor powder for use in making a varistor is disclosed. This precursor powder is produced by preparing a homogeneous aqueous dispersion of metal oxides and/or metal hydroxides and heating the dispersion in a closed pressure reactor to a temperature between 200° C. and 350° C. for hydrothermally treating the homogeneous dispersion. The precursor powder produced in the afore-described method is highly homogeneous and of controlled crystal phase and morphology and after mixing with zinc oxide powder can homogeneously be reacted with the zinc oxide in a ceramic process.

17 Claims, 1 Drawing Sheet

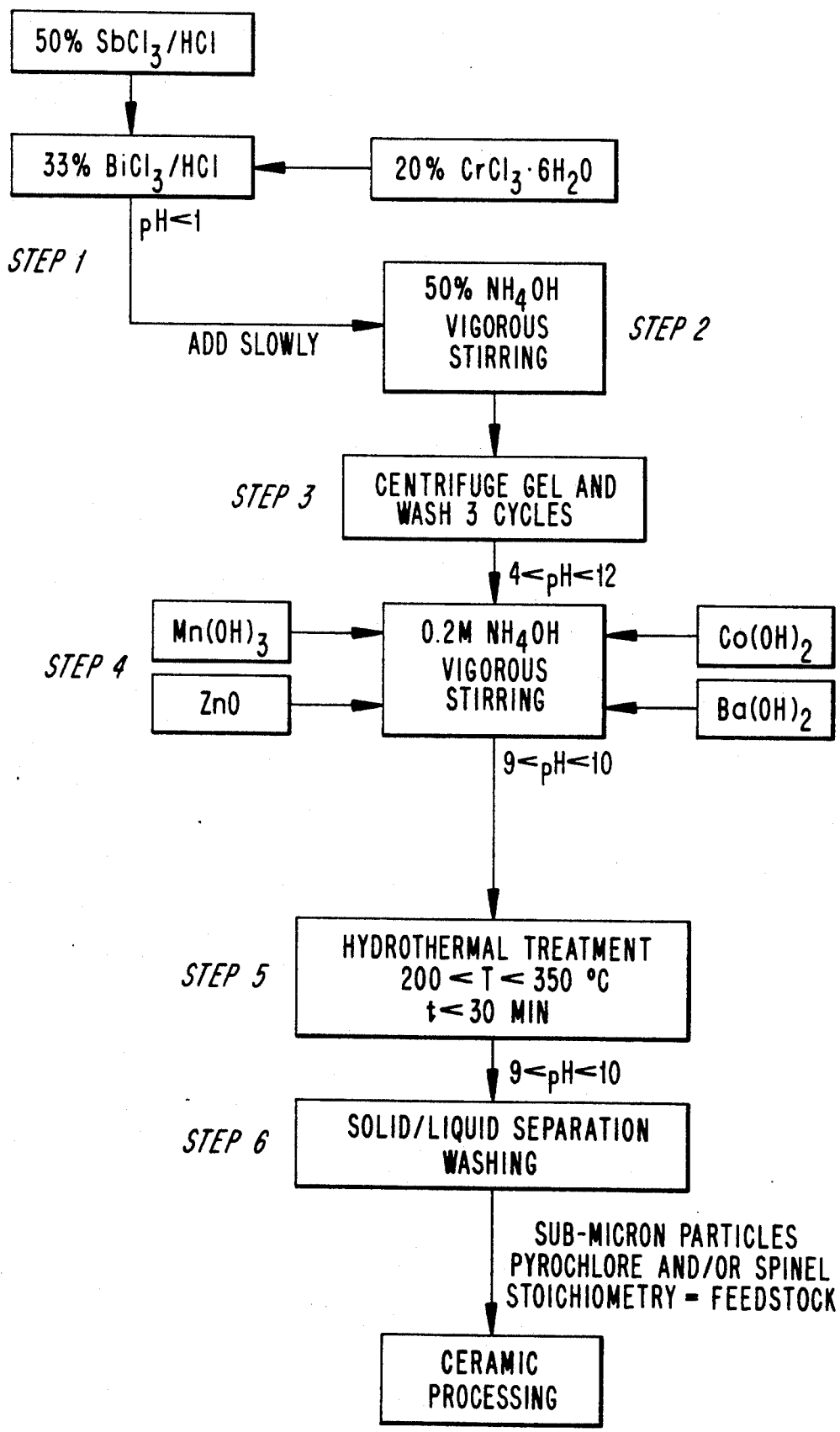

PROCESS FOR MANUFACTURING A PRECURSOR POWDER FOR USE IN MAKING A VARISTOR AND A POWDER MANUFACTURED IN THIS PROCESS

BACKGROUND OF THE INVENTION

The invention relates to a process for manufacturing a precursor powder for use in making a varistor and containing dopants which after bending said precursor powder with a basic powder in a ceramic process are distributed in the grains of the basic powder.

It is known from U.S. Pat. No. 4,142,996 to manufacture a precursor powder for use in making a varistor in combining oxy-salts of zinc and dopant additives in water, heating to form a hydrated melt, and heating further to form a dehydrated melt. The melt is spray-dried to form a varistor ceramic powder. A further process for manufacturing a precursor powder for use in making a varistor is described in U.S. Pat. No. 4,540,971, in which zinc oxide is combined with at least a portion of the dopants. In this process, an aqueous solution containing salts of zinc and components is co-precipitated to form a uniform precipitate. The precipitate is then collected by vacuum filtration and is freeze-dried to remove free water and to form the precursor powder.

It is further known to precipitate zinc under hydrothermal conditions. U.S. Pat. No. 1,536,619 describes the precipitation of zinc hydroxide and zinc carbonate from zinc chloride solutions to recover zinc metal values. U.S. Pat. No. 1,863,700 discloses a similar process, although the precipitate is heated in saturated steam at 300° C. to increase the particle size of the precipitate. In U.S. Pat. No. 3,674,476 a hydrothermal treatment step is used to produce a zinc oxide powder for use in a photoconductive layer for electrophotography. In this process, an autoclave treatment of zinc hydroxide or zinc carbonate at a temperature of between 180° and 300° C. is employed to produce a fine zinc oxide powder. A hydrothermal process for producing a doped zinc oxide powder for varistor applications is described by W. J. Dawson in Ceramic Bulletin, Vol. 67, No. 1988, p. 1673-1078. Hereby the goal is to produce a fully precipitated compound containing primarily zinc oxide and varistor dopants including bismuth and manganese oxides. A hydrothermal treatment step was used to accomplish the precipitation.

SUMMARY OF THE INVENTION

It is one object of this invention to provide a process for manufacturing a precursor powder for use in making a varistor in a reproducible way which produces a very fine-grained powder whose grains are chemically homogeneous and of uniform particle size.

It is another object of this invention to provide a precursor powder for use in making a varistor which consists of fine, uniform crystallites which are compounds of the varistor dopants and which are coagulated to give powder particles with uniform size and average diameters of less than 1 micron.

The inventors of this invention have noted the fact, that a hydrothermal process involves the reaction of constituent oxides or precursors of the oxides in the presence of hot water and that powders produced by this method are typically composed of anhydrous single-crystal particles with sub-micron size (10 to 1000 nm). Milling or high-temperature calcination steps are not required, eliminating the associated problems of agglomeration and contamination. It is remarkable that elements can be incorporated in several forms in the manufacturing process: oxides, hydroxides and salts. This allows for flexibility with regard to raw materials. Advantages of the process include the ability to directly produce a fine, uniform composite powder which can be mixed with the basic precursor powder, including zinc oxide.

The precursor powder produced in a process according to the invention has high purity, controlled morphology, and narrow size distribution compared to those produced by conventional methods, including calcination and milling processes. Specific advantages of the precursor powder relative to varistor applications include uniform dopant distribution, potential for microstructural control (by control of powder morphology), and processing reproducibility. The precursor powder consists of fine, uniform crystallites which are compounds of the varistor dopant oxides. The crystallites have diameters less than 0.1 microns, and are coagulated to give primary particles with uniform size and average diameters of less than 1 micron. The composite powders contain varistor dopants, including amongst others Ba, Bi, RE, Sb, Co, Mn, Cr, Sn and Ni. In addition, zinc can be added to control the crystalline phase of the dopant oxide. The composite powders have nearly ideal characteristics for blending with zinc oxide, and for subsequent compacting and sintering the mixed powder to form a varistor part. Because of their chemical uniformity, ensured by their fine crystallite size and single phase nature, these powders impart a homogeneous microstructure to the varistor part.

The powder produced by the process according to the invention has a unique crystalline formulation. Specifically, the products formed are variations of spinel and pyrochlore compounds with the general formulae: $Zn_7 Sb_2 O_{12}$ and $Zn_2Bi_3Sb_3O_{14}$, respectively, but which also contain other dopant constituents: Co, Cr and Mn in solid solutions. Either a mixture of spinel and pyrochlore products can be formed or a nearly single phase pyrochlore material can be formed, depending on the powder composition.

DESCRIPTION OF THE DRAWING

The only FIGURE is a process diagram in accordance with one preferred embodiment of the invention for making a precursor powder consisting of submicron particles of pyrochlore and/or spinel stoichiometry and containing dopants which after blending with ZnO-powder in a ceramic process are distributed in the ZnO-grains of a ZnO-varistor.

DETAILED DESCRIPTION OF THE INVENTION

As can be taken from the FIGURE in the preferred embodiment of the invention six major steps have to be executed.

In a step 1, salts including oxychlorides, chlorides, acetates and/or nitrates, using the exact ratios required in the precursor powder, respectively, in the varistor powder, are dissolved in an acid/water solution to form an acidic solution of any or all of the following: antimony, barium, bismuth, chromium, zinc, cobalt and manganese.

In a step 2, dissolved salt solution is added slowly to a vigorously mixed, basic solution containing a predetermined concentration of one, all or any of the hydroxides of sodium, ammonium and potassium until a pH value of between 4 and 12 is reached. The precise pH value is dependent on the components added in step 1. Use of manganese in step 1 dictates a high pH endpoint, whereas antimony and bismuth can be precipitated over a wide range of pH.

In a step 3, the precipitate formed in step 2 is separated from the resultant salt solution and is washed with purified water until the chloride, nitrate, acetate and/or free hydroxide contents of the precipitate are sufficiently low to favor nearly complete incorporation of all elements in a further step 5. This can generally be tested by measuring the specific conductivity of the wash liquor, and by washing until a specific conductivity below 10 mmho is obtained.

In a step 4, the washed precipitate is then redispersed in purified water and is vigorously mixed to form a homogeneous slurry with other varistor constituents, again using the exact ratios required in the precursor powder, including zinc oxide, and/or manganese, barium and/or cobalt hydroxides. It is preferable to add zinc oxide and barium hydroxide in this step, instead of step 1, because of the low cost of zinc oxide. On the other hand, it is preferable to add cobalt and manganese in step 1, because of considerations of morphology and compositional control. However, addition of these in step 1 may be prohibited by cost and/or purity considerations. After mixing, the pH of the slurry is adjusted by adding ammonium hydroxide to give a concentration of between 0.2 and 0.5 molar ammonium hydoxide.

In the step 5, the homogeneous slurry is hydrothermally treated. It is introduced into a closed pressure reactor, which can be either a stirred autoclave or a plug flow vessel, and is heated to a temperature between 200° and 300° C., the exact temperature depending on the composition of the precursor powder, and in the presence of an oxidizing gas or alternatively a non-contaminating liquid oxidizer, for a period of time preferably not exceeding 30 minutes. The slurry is then cooled to below 100° C., and removed from the pressure vessel.

In a step 6, the crystalline solids formed in the hydrothermal treatment are separated from the liquid phase, which is essentially free of soluble oxide components and are washed to remove remaining ionic impurities. The crystalline solids have essentially the same metal ion stoichiometry as the feed material for the process.

Hereby, the process parameters can be adapted to control powder stoichiometry, metallic ion valency and particle morphology. In general, ammonium hydroxide, sodium hydroxide and potassium hydroxide can be added in the hydrothermal treatment step (step 5) to improve the product crystallinity and to promote formation of composite oxide phases. Increased reaction pH also favors barium incorporation. The metallic ion valency can be controlled by addition of soluble oxidizing or reducing medium. In compositions employing bismuth, it is desirable to use an oxidizing gas or other oxidizing media which will prevent formation of bismuth metal as a reaction by-product. Powder morphology can be controlled using ammonium hydroxide in the hydrothermal treatment step. At low and high ammonium hydroxide concentrations, products are agglomerated, resulting in relatively large particle sizes ranging from 1 to 3 microns. At intermediate ammonium hydroxide concentrations, from 0.2 to 0.5 molarity, particles are fine (less than 0.5 microns) and uniform. Metallic ion incorporation can be controlled by both process pH and oxidation potential. In general, chromium incorporation is increased at increasingly basic pH values. Barium incorporation is improved by oxidizing conditions during hydrothermal treatment.

Several experiments were carried out to determine the effect of feedstock preparation and treatment variables and to arrive at near optimum processing conditions for two dopant formulations.

Experiments were conducted using a 3.785 liter stirred autoclave with a fill volume of 1.5 liters. Chemicals used in the experiments were high purity salts, oxides and hydroxides.

In a typical experiment, a hydroxide precipitate was produced by pouring a mixed salt solution, containing any or all of the dopant constituents, into a 1.5 liter basic solution of predetermined concentration, at a rate of between 5 and 100-ml per minute. The precipitate was further blended for approximately 10 to 20 minutes, at which time the slurry was removed and separated in a bottle centrifuge. The precipitate was collected and washed with purified water until most of the salts were removed. It was then redispersed in water and blended with the remaining components. Ammonium hydroxide was added, and the mixture was placed in the autoclave and sealed. An overpressure of oxygen was added at room temperature. The vessel was heated using external heaters to the reaction temperature and held for a short time. It was then cooled and the products were removed. The solids were recovered using a bottle centrifuge.

The products were analyzed by X-ray diffraction to determine crystalline phase, by centrifugal particle analysis to determine agglomerate size, by electron microscope to determine crystallite morphology, and by microprobe analysis to determine chemical homogeneity. The primary decantate (the solution phase formed in the reaction) was analyzed by inductively coupled plasma analysis to determine the concentrations of unreacted elements.

EXAMPLE 1

A composite powder was produced with the oxygen free stoichiometry: 45 atom % Sb, 20% Bi, 15% Co, 10% Mn, 5% Ba and 5% Cr. A 50 weight percent solution of $SbCl_3$ in concentrated HCl was codissolved with a 33.3 weight percent solution of BiOCl in concentrated HCl and a 20 weight percent solution of $CrCl_3 \cdot 6H_2O$ in distilled water. The solution was poured at a rate of 25 ml/minute into a stainless steel blender containing 1.5 liters of a distilled water/ammonium hydroxide solution containing 241.5 grams concentrated ammonium hydroxide. After coprecipitation was completed, the mixture was blended for an additional 20 minutes. The slurry was then separated in a bottle centrifuge. The clear liquid phase was decanted and analyzed for metal ion concentration to ensure complete precipitation. The pH was measured to be 8.69. The precipitate was washed with distilled water to remove salts.

The precipitate was redispersed in 1 liter distilled water. A 50 weight percent solution of ammonium hydroxide was added. Next, cobalt hydroxide, manganese hydroxide and barium hydroxide (octahydrate) were added. The mixture was poured into a 3.785 liter autoclave, and the autoclave was sealed. A pressure of 13.6 atmospheres of oxygen gas was added to the vapor space above the solution. The autoclave was heated to 240° C., while stirring at a rate of 350 rpm, and was held at this temperature for 30 minutes. The autoclave was cooled to 90° C. and opened to atmospheric pressure. The resultant slurry was separated in a bottle centrifuge. The clear liquid phase was decanted and analayzed for metal ion concentrations by inductively coupled plasma. Concentrations of unreacted metals were 7.25 mg/l Sb, 202 mg/l Cr and less than 1 mg/l Bi, Co, Mn and Ba.

The solid phase was analyzed by XRD=x-ray diffraction and determined to be primarily a pyrochlore structure material with the lattice parameter of 10.39 Å. A minor concentration (about 5%) of $Mn_3O_4$ was also produced in the reaction.

The powder consisted of aggregates with an average size of 0.46 microns. The aggregates consisted of fine crystallites of the pyrochlore material mixed with an equally fine manganese oxide phase.

EXAMPLE 2 through 12

Several powders having the same stoichiometry as Example 1 were produced using a variety of hydrothermal treatment concentration, reaction temperature and time, source of manganese and the number of precipitate wash cycles. The procedure used was generally the same as that applied in the previously described example. A summary of process parameters and a summary of powder characteristics are in a table as follows:

TABLE
VARISTOR DOPANT POWDER PREPARATION

| Ex No. | Temp °C. | Time min | NH4OH g/l | Wash cycles | Source Mn |
|---|---|---|---|---|---|
| 2 | 300 | 30 | 28.9 | 3 | $Mn_2O_3$ |
| 3 | 300 | 30 | 5.8 | 3 | $Mn_2O_3$ |
| 4 | 300 | 30 | 57.8 | 3 | $Mn_2O_3$ |
| 5 | 200 | 0 | 11.6 | 3 | $Mn_2O_3$ |
| 6 | 200 | 15 | 11.6 | 3 | $Mn_2O_3$ |
| 7 | 200 | 30 | 11.6 | 3 | $Mn_2O_3$ |
| 8 | 200 | 60 | 11.6 | 3 | $Mn_2O_3$ |
| 9 | 230 | 0 | 11.6 | 3 | $Mn_2O_3$ |
| 10 | 230 | 30 | 11.6 | 3 | $Mn_2O_3$ |
| 11 | 260 | 0 | 11.6 | 3 | $Mn_2O_3$ |
| 12 | 230 | 30 | 11.6 | 5 | $Mn_2O_3$ |

| Ex No. | Crystal Phase (Latt. par Å) | Avg. Aggregate size, micron |
|---|---|---|
| 2 | P (10.40) + $Mn_2O_3$ | 0.87 |
| 3 | P (10.39) + $Mn_2O_3$ | 1.46 |
| 4 | P (10.38) + $Mn_2O_3$ | 1.40 |
| 5 | N.D. | 1.98 |
| 6 | P + $Mn_2O_3$ | N.D. |
| 7 | P + $Mn_2O_3$ | N.D. |
| 8 | P (10.43) + $Mn_2O_3$ + $BaCrO_4$ | 0.75 |
| 9 | P (10.40) + $Mn_2O_3$ | N.D. |
| 10 | N.D. | 0.84 |
| 11 | N.D. | 0.85 |
| 12 | P (10.41) + $Mn_2O_3$ + $BaCrO_4$ | 0.95 |

N.D. = not determined

A crystalline pyrochlore phase material could be produced at temperatures as low as 200° C. and for a residence time of 15 minutes. The powder became more crystalline at higher reaction temperatures and longer residence times. A minimum temperature of about 230° C. was required to produce a highly crystalline material in less than 30 minutes. Minimum aggregate size was achieved using an ammonium hydroxide concentration in the range of 11.6 to 28.9 grams per liter. This range also corresponded to the best range for high levels of incorporation (greater than 99 percent) of all dopant constituents.

EXAMPLE 13

A composite powder was produced with the oxygen free stoichiometry:

50.0 atom % Zn, 25.0% Sb, 10.0% Bi, 9.5% Co, 4.0% Mn, 1.0% Ba and 0.5% Cr. A 50 weight percent solution of $SbCl_3$ in concentrated HCl was codissolved with a 33.3 weight percent solution of BiOCl in concentrated HCl and a 20 weight percent solution of $CrCl_3 \cdot 6H_2$ in distilled water. The solution was poured at a rate of 100 ml/minute into a stainless steel blender containing 1.5 liters of a distilled water/ammonium hydroxide solution containing concentrated ammonium hydroxide, while blending. After coprecipitation was completed, the mixture was blended for an additional 20 minutes. The slurry was then separated in a bottle centrifuge. The clear liquid phase was decanted and analyzed for metal ion concentration to ensure complete precipitation. The pH was measured to be 8.15. The precipitate was washed with distilled water to remove salts.

The precipitate was redispersed in 1 liter distilled water. A 50 weight percent solution of ammonium hydroxide was added. Next, cobalt hydroxide, freshly precipitated manganese hydroxide, barium hydroxide (octahydrate) and ZnO were added. The mixture was poured into a 3.785 liter autoclave, and the autoclave was sealed. A pressure of 13.6 atmospheres of oxygen gas was added to the vapor space above the solution. The autoclave was heated to 240° while stirring at a rate of 350 rpm, and was held at this temperature for 30 minutes. The autoclave was cooled to 90° C. and opened to atmospheric pressure. The resultant slurry was separated in a bottle centrifuge. The clear liquid phase was decanted and analyzed for metal ion concentrations by inductively coupled plasma. Concentrations of unreacted metals were 1.38 mg/l Sb, 56.5 mg/l Ba, 6.25 mg/l Zn and less than 1 mg/l Cr, Bi, Co and Mn.

The solid phase was analyzed by XRD and determined to be primarily a mixture of a pyrochlore structure material with the lattice parameter of 10.43 Å and a spinel structure material with a lattice parameter of 8.53 Å. A minor concentration (about 5%) of $Mn_3O_4$ was also produced in the reaction.

The powder consisted of aggregates with an average size of 0.43 microns. The aggregates consisted of fine crystallites of the pyrochlore and spinel materials mixed with an equally fine manganese oxide phase.

EXAMPLE 14

A composite powder was produced with the oxygen free stoichiometry: 50.0 atom % Zn, 25.0% Sb, 10.0% Bi, 9.5% Co, 4.0% Mn, 1.0 Ba and 0.5% Cr. A 50 weight percent solution of $SbCl_3$ in concentrated HCl was codissolved with a 50.0 weight percent solution of $BiCl_3$ in concentrated HCl, a 20 weight percent solution of $CrCl_3 \cdot 6H_2O$ in distilled water, a 50 weight percent solution of $ZnCl_2$ and a 27.4 weight percent solution of $MnCl_2 \cdot 4H_2O$. The solution was poured at a rate of 100 ml/minute into a stainless steel blender containing 1.5 liters of a distilled water/sodium hydroxide solution containing 174.8 grams sodium hydroxide, while blending. After coprecipitation was completed, the mixture was blended for an additional 10 minutes. The slurry was then separated in a bottle centrifuge. The clear liquid phase was decanted and analyzed for metal ion concentration to ensure complete precipitation. The pH was measured to be 7.6. The precipitate was washed with distilled water to remove salts. One quarter of the precipitate was redispersed in 1400 ml distilled water containing an appropriate amount of a 50 weight percent solution of sodium hydroxide. Next, cobalt hydroxide and barium hydroxide (octahydrate) were added. The mixture was poured into a 3.785 liter autoclave, and the autoclave was sealed. A pressure of 1.4 atmospheres of oxygen gas was added to the vapor space above the solution. The autoclave was heated to 350° C., while stirring a rate of 350 rpm, and was held at this temperature for 30 minutes. The autoclave was cooled to 90° C. and opened to atmospheric pressure. The resultant slurry was separated in a bottle centrifuge. The clear liquid phase was decanted and analyzed for metal ion concentrations by inductively coupled plasma. Concentrations of unreacted metals were 52.4 mg/l Sb, 1060 mg/l Zn, 155 mg/l Cr and less than 1 mg/l Ba, Bi, Co and Mn.

The solid phase was analyzed by XRD and determined to be primarily a mixture of a pyrochlore structure material with the lattice parameter of 10.40 Å and a spinel structure material with a lattice parameter of 8.47 Å. The powder was analyzed for particle size by centrifugal particle analysis. It is consisted of aggregates with an average size of 2.03 microns.

EXAMPLE 15

A composite powder was produced with the oxygen free stoichiometry: 50.0 atom % Zn, 25.0% Sb, 10.0% Bi, 9.5% Co, 4.0% Mn, 1.0% Ba and 0.5% Cr. An appropriate amount of antimony oxide was mixed bismuth oxide, ZnO, Mn(II)O, cobalt hydroxide, chromium acetate, and barium hydroxide (octahydrate) in 1030 grams distilled water containing 168.3 grams of dissolved KOH. The solutions was poured into a 3.785 liter autoclave, and the autoclave was sealed. A pressure of 1.4 atmosphere of oxygen gas was added to the vapor space above the solution. The autoclave was heated to 300° C., while stirring at a rate of 350 rpm, and was held at this temperature for 30 minutes. The autoclave was cooled to 90° C. and opened to atmospheric pressure. The resultant slurry was separated in a bottle centrifuge. The clear liquid phase was decanted and analyzed for metal ion concentrations by inductively coupled plasma. Concentrations of unreacted metals were 1645 mg/l Sb, 737 mg/l Zn, 3.50 mg/l Bi, 3.75 mg/l Cr and less than 1 mg/l Ba, Co and Mn.

The solid phase was analyzed by XRD and determined to be primarily a mixture of a pyrochlore structure material with the lattice parameter of 10.46 Å and a spinel structure material with a lattice parameter of 8.56 Å. ZnO also remained in the product of the reaction.

EXAMPLE 16

A composite powder was produced with the oxygen free stoichiometry: 50.0 atom % Zn, 25.0% Sb 10.0% Bi, 9.5% Co, 4.0% Mn, 1.0% Ba and 0.5% Cr. An appropriate amount of a $Sb(C_2H_3O_2)_3$ was dissolved in 200 grams concentrated acetic acid by heating at 68° C. Likewise, bismuth acetate were dissolved in 250.1 grams of concentrated acetic acid at 105° C. The two solutions were combined and added to an solution of 500 grams distilled water, zinc acetate, cobalt acetate, manganese acetate and chromium acetate which was previously heated to 80° C. The solution was poured at a rate of 100 ml/minute into a stainless steel blender containing 1.5 liters of distilled water/potassium hydroxide solution containing 565.9 grams concentrated ammonium hydroxide, while, after coprecipitation was completed, the mixture was blended for an additional 10 minutes. The slurry was then separated in a bottle centrifuge. The clear liquid was decanted and analyzed for metal ion concentration to ensure precipitation. The pH was measured to be 13.72. The precipitate was washed with distilled water to remove salts. The precipitate was redispersed in 1 liter distilled water. An amount of barium hydroxide (octahydrate) was added, and the slurry volume was adjusted to 1.5 liters. The mixture was poured into a 3.785 liter autoclave, and the autoclave was sealed. A pressure of 1.4 atmospheres of oxygen gas was added to the vapor space above the solution. The autoclave was heated to 300° C., while stirring at a rate of 350 rpm, and was held at this temperature for 60 minutes. The autoclave was cooled to 90° C. and opened to atmospheric pressure. The resultant slurry was separated in a bottle centrifuge. The clear liquid phase was decanted and analyzed for metal ion concentrations by inductively coupled plasma. Concentrations of unreacted metals were 2.25 mg/l Bi, 4.00 mg/l Ba, 5.00 mg/l Zn and less than 1 mg/l Cr, Sb, Co and Mn.

The solid phase was analyzed by XRD and determined to be primarily a mixture of a pyrochlore material with the lattice parameter of 10.46 Å and a spinel structure material with a lattice parameter of 8.56 Å.

EXAMPLE 17

A composite powder was produced with the oxygen free stoichiometry: 57.0 atom % Zn, 30% Sb, 12% Bi and 1.0% Ba. An appropriate amount of a 50 weight percent solution of $SbCl_3$ in concentrated HCl was codissolved with a 33.3 weight percent solution of BiOCl in concentrated HCl. The solution was poured at a rate of 100 ml/minute into a stainless steel blender containing 1.5 liters of a distilled water/ammonium hydroxide solution containing concentrated ammonium hydroxide, while blending. After coprecipitation was completed, the mixture was blended for an additional 10 minutes. The slurry was then separated in a bottle centrifuge. The clear liquid phase was decanted and analyzed for metal ion concentration to ensure complete precipitation. The pH was measured to be 8.45. The precipitate was washed with distilled water to remove salts.

The precipitate was redispersed in 1 liter distilled water. An appropriate amount of a 50 weight percent solution of ammonium hydroxide was added. Next, corresponding quantities of zinc oxide, and barium hydroxide (octahydrate) were added. The mixture poured into a 3.785 liter autoclave, and the autoclave was sealed. A pressure of 13.6 atmospheres of oxygen gas was added to the vapor space above the solution. The autoclave was heated to 300° C., while stirring at a rate of 350 rpm, and was held at this temperature for 30 minutes. The autoclave was cooled to 90° C. and opened to atmospheric pressure. The resultant slurry was separated in a bottle centrifuge. The clear liquid phase was decanted and analyzed for metal ion concentrations by inductively coupled plasma. Concentrations of unreacted metals were 36.2 mg/l Zn, 1540 mg/l Ba, 1.25 mg/l Co and less than 1 mg/l Cr, Bi, Sb and Mn. The solid phase was analyzed by XRD and determined to be primarily a mixture of a pyrochlore structure material with the lattice parameter of 10.43 Å and a spinel structure material with the lattice parameter of 8.61 Å.

While the invention has been described with reference to the foregoing embodiments, various changes and modifications may be made thereto without departing from the spirit of the invention as defined in the appended claims.

The invention claimed is:

1. A process for manufacturing a precursor powder containing dopants for use in making a metal oxide varistor, having a metal ion stoichiometry of said dopant, comprising the steps of:
   (a) preparing a homogeneous aqueous dispersion of metal oxides or metal hydroxides or mixtures thereof having said metal ion stoichiometry, said dispersion comprising three or more elements selected from the group consisting of zinc, antimony, bismuth, manganese, cobalt, chromium, barium, nickel, rare earths, silicon, tin, aluminum, boron and mixtures thereof,
   (b) heating said dispersion in a closed pressure reactor to a temperature between 200° and 350° C. in order to hydrothermally treat said homogeneous dispersion,
   (c) cooling said hydrothermally treated dispersion to a temperature below about 100° C.,
   (d) separating the precursor powder from a solution resulting from the hydrothermal treatment of said homogeneous dispersion, and
   wherein the precursor powder obtained is primarily of the spinel or pyrochlore or spinel and pyrochlore crystalline formulation.

2. A process according to claim 1, further comprising the steps of:
   (e) dissolving at least one salt in an aqueous acid solution to form an acidic solution of at least one of the following metal ions: aluminum, antimony, barium, bismuth, boron, chromium, cobalt, manganese, nickel, rare earths, silicon, tin and zinc,
   (f) combining said acidic solution with a basic solution to form a precipitate comprising of at least one metal ion in the form of the corresponding metal oxide or metal hydroxide disclosed in step a,
   (g) separating said precipitate from the salt solution produced in step (f), and
   (h) redispersing said precipitate in water to prepare at least part of said homogeneous dispersion of step (a).

3. A process according to claim 2 further comprising the step of:
   (i) mixing said redispersed precipitate with oxides or hydroxides or mixtures thereof of at least one of the following metals: aluminum, antimony, barium, bismuth, boron, chromium, cobalt, manganese, nickel, rare earths, silicon, tin and zinc to prepare said homogeneous dispersion of step (a).

4. A process according to claim 3, in which said oxides or hydroxides or mixtures thereof of step (i) comprise barium or zinc or mixtures thereof and said salts of step (e) comprise at least cobalt or manganese or mixtures thereof.

5. A process according to claim 2, further comprising the step of:
   (j) adding a base to said aqueous dispersion prepared in step (a), whereby base is added until a pH of between 4 and 12 is reached, the pH being adjusted as a function of the at least one salt dissolved in step (e).

6. A process according to claim 1, further comprising the step of:
   (j) adding a base to said aqueous dispersion prepared in step (a).

7. A process according to claim 5, in which said base is added until a pH of between 4 and 12 is reached.

8. A process according to claim 5, in which the base added to said aqueous dispersion prepared in step (a) is ammonium hydroxide.

9. A process according to claim 8, further comprising the step of:
   (l) maintaining said aqueous dispersion at an ammonium hydroxide concentration of between 0.2 and 0.5 molar.

10. A process according to claim 8, in which step (b) is executed for a period of time not exceeding 30 minutes.

11. A process according to claim 8 in which step (b) is executed at a temperature between 200° and 300° C.

12. A process according to claim 6, in which the base added to said aqueous dispersion prepared in step (a) is ammonium hydroxide.

13. A process according to claim 12, further comprising the step of:
   (l) maintaining said aqueous dispersion at an ammonium hydroxide concentration of between 0.2 and 0.5 molar.

14. A process according to claim 12, in which step (b) is executed for a period of time not exceeding 30 minutes.

15. A process according to claim 12, in which step (b) is executed at a temperature between 200° and 300° C.

16. A process according to claim 1, further comprising the step of:
   (k) adding an oxidizing gas or liquid oxidizer or mixtures thereof into said pressure reactor before execution of step (b).

17. A process for manufacturing a precursor power containing dopants for use in making a metal oxide varistor, having a metal ion stoichiometry, said dopants comprising the steps of:
   (a) preparing a homogeneous aqueous dispersion of metal oxides or metal hydroxides or mixtures thereof having said metal ion stoichiometry, said dispersion comprising three or more elements selected from the group consisting of zinc, antimony, bismuth, manganese, cobalt, chromium, barium, nickel, rare earths, silicon tin, aluminum, boron and mixtures thereof,
   (b) hydrothermally treating said homogeneous dispersion by heating said dispersion in a closed pressure reactor,
   (c) cooling said hydrothermally treated dispersion,
   (d) separating the precursor powder from the hydrothermally treated dispersion, whereby said precursor powder consists essentially of the spinel or pyrochlore or spinel and crystalline formations.

* * * * *